United States Patent [19]

Wu

[11] Patent Number: 6,164,776
[45] Date of Patent: Dec. 26, 2000

[54] ANGLE ADJUSTABLE DEVICE FOR EYEGLASSES

[76] Inventor: Wen-Che Wu, No. 241 Tang Ding, Tang Ding Village, Hsin Shih, Tainan County, Taiwan

[21] Appl. No.: 09/472,537

[22] Filed: Dec. 27, 1999

[51] Int. Cl.⁷ .................................................. G02C 1/02
[52] U.S. Cl. ............................ 351/120; 351/110; 351/111
[58] Field of Search ..................................... 351/120, 111, 351/110, 140, 41

[56] References Cited

U.S. PATENT DOCUMENTS

| | | | |
|---|---|---|---|
| 5,659,381 | 8/1997 | Simioni | 351/120 |
| 5,661,535 | 8/1997 | Wang | 351/120 |

Primary Examiner—Hung Xuan Dang
Attorney, Agent, or Firm—Alan Kamrath

[57] ABSTRACT

An angle adjustable device for eyeglasses includes a lens with two side bent protectors formed integral, and two temples combined with the two side bent protectors of the lens. Each end section of the temples has a first T-shaped engage means and a second engage means formed in an inner side surface. Each side bent protector has a curved guide slot and a center hole provided with notches. Then the T-shaped engage means engages the curved guide slot to move therein and the second engage means fits in the center hole with the second engage means functioning as a pivot to let the lens moved up or down to adjust its angle relative to the two temples.

1 Claim, 2 Drawing Sheets

ANGLE ADJUSTABLE DEVICE FOR EYEGLASSES

BACKGROUND OF THE INVENTION

This invention relates to an angle adjustable device for eyeglasses, particularly to one possible to adjust an upward or downward angle of the two temples (or two lenses) according to the face or nose shape of a wearer, obtaining the aim with simple components.

Eyeglasses have a wide variety for correcting eyesight or protecting eyes in work or for sports. Their structure also varies from one another, and some have the lenses and the temples combined immovable not to change angles, some have lenses and temples adjustable for a user to adjust the angles of the temples to suit to one's face or nose.

SUMMARY OF THE INVENTION

The objective of the invention is to offer an angle adjustable device for eyeglasses, which includes a lens with two side bent protectors and two temples. Each side bent protector has a curved guide slot and a center hole with small notches. Each temple has a front end section provided with a first T-shaped engage means and a second engage means. In combining the lens with the two temples, the first T-shaped engage means fits and protrudes the curved guide slot and the second engage means engaging with the center hole of each side bend protector. Then the lens can be adjusted up or down by manually moving the two side bent protectors relative to the two temples.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
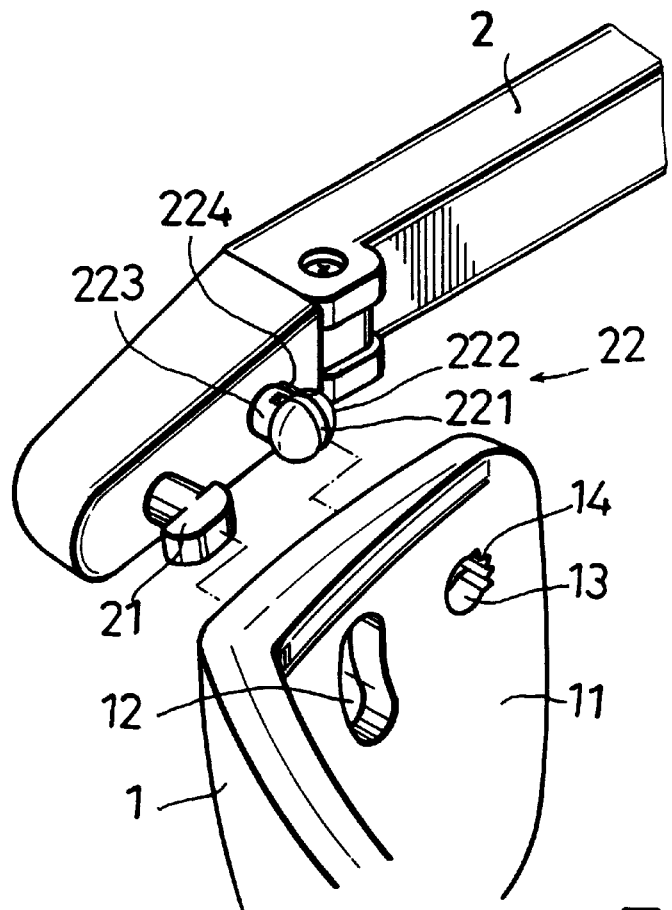
FIG. 1 is an exploded perspective view of an angle adjustable device for eyeglasses in the present invention.

A preferred embodiment of an angle adjustable device for eyeglasses in the present invention, as shown in FIG. 1, includes a lens 1 formed integral, two temples 2 respectively combined with two sides of the lens 1.

The lens 1 has a side protective member 11 formed bent at two sides of the lens 1. Each side protector 11 has a curved guide slot 12 and a center hole 13 formed with plural small notches 14 shaped as ratchets in an inner partial surface.

Each temple 2 has a T-shaped first engage means 21 on an inner side of an end section, and a second engage means 22 on the inner side of the end section spaced apart from the first engage means. The second engage means 22 has an annular groove 221 on a large diameter part 222 and a smaller diameter lower part 223. The lower part 223 has plural tabs 224 to fit in the ratchet-shaped notches 14 of the center hole 13.

Figure 3:
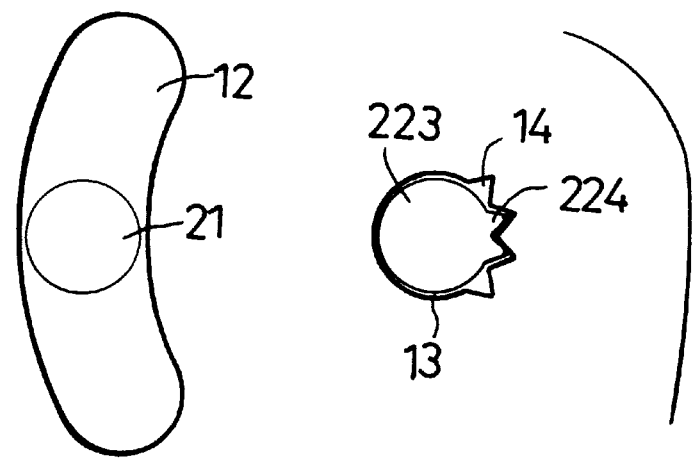
FIG. 3 is a partial side view of the angle adjustable device for eyeglasses in the present invention; and, FIG. 4 is a side view of the angle adjustable device for eyeglasses in the present invention.
Figure 2:
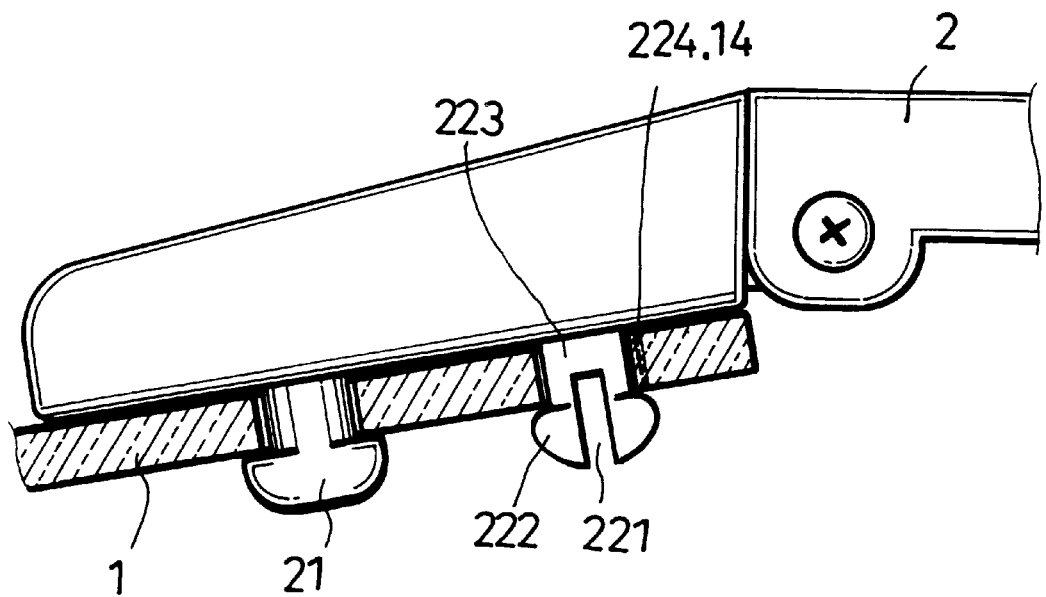
FIG. 2 is a side cross-sectional view of the angle adjustable device for eyeglasses in the present invention.

When the two temples 2 are combined with the lens 1, as shown in FIGS. 2 and 3, the first engage means 21 is made to extend in the curved guide slot 12 and let an upper portion of the first engage means 21 protrude out of the curved guide slot 12. Then the temple is turned around to the normal position. Then the second engage means 22 is made to extend in the center hole 13 of the side protector 11, letting the large diameter part 222 protrude out of the center hole 13 and the plural tabs 224 of the lower part 223 fit in the notches 14.

Figure 4:
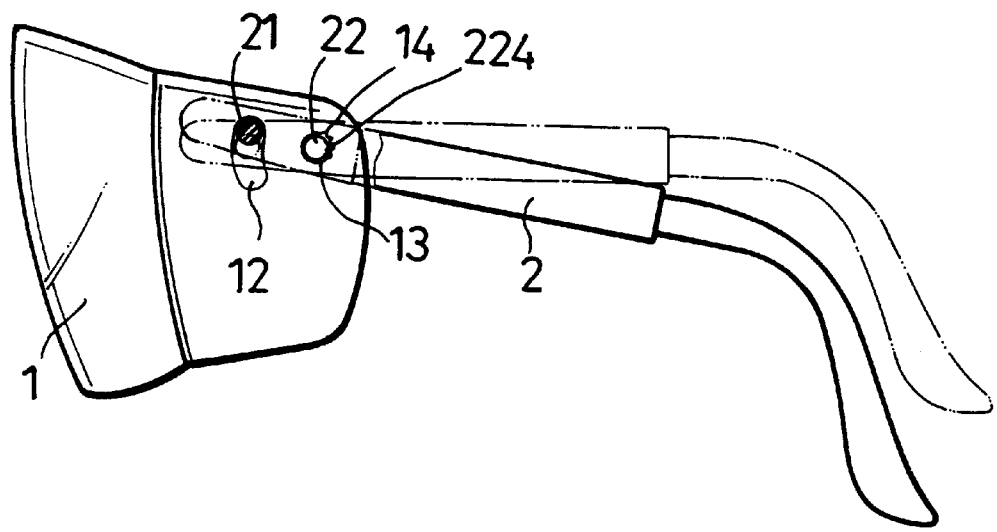

If a user wants to adjust the angle of the temples 2, as shown in FIG. 4, the lens 1 with the two side protectors 11 is manually moved up or down relative to the two temples 2, with the second engage means 22 as a pivot. Then the lens 1 can be adjusted in its position upward or downward, permitting the user can wear the eyeglasses in a comfortable position.

While the preferred embodiment of the invention has been described above, it will be better understood that various modifications may be made therein and the appended claims are intended to cover all such modifications which may fall within the spirit and scope of the invention.

What is claimed is:

1. An angle adjustable device for eyeglasses comprising a lens formed integral and having an end protector bent at two opposite sides, each said end protector having a curved guide slot and a center hole having plural ratchet-shaped small notches in an inner partial surface;

two temples respectively having an end section to combine said each said side protector of said lens, each said end section having a first T-shaped engage means and a second engage means spaced apart on an inner side surface, said second engage means having an upper large round portion provided with an annular groove and a lower small diameter portion provided with plural tooth-shaped tabs;

said lens and said two temples combined together with the location of said lens adjustable by said first engage means extending in said curved guide slot and with an upper portion protruding out of said guide slot and with the lower portion of said first T-shaped engage means movable in said guide slot, said second engage means fitting in said center hole of each said side protector with said large round portion protruding out of said center hole of each said end protector and with said tabs engaging said notches of said center hole, then the lens possible to be adjusted in its position upward or downward by manually moving up and down said lens against said two temples with said second engage means functioning as a pivot.

* * * * *